United States Patent
Erskine

(10) Patent No.: US 9,743,640 B1
(45) Date of Patent: Aug. 29, 2017

(54) PORTABLE DEER AND LIVESTOCK FEEDER

(71) Applicant: Dennis Erskine, Bandera, TX (US)

(72) Inventor: Dennis Erskine, Bandera, TX (US)

(*) Notice: Subject to any disclaimer, the term of this patent is extended or adjusted under 35 U.S.C. 154(b) by 0 days.

(21) Appl. No.: 15/219,281

(22) Filed: Jul. 26, 2016

Related U.S. Application Data

(63) Continuation-in-part of application No. 14/821,768, filed on Aug. 9, 2015, now abandoned.

(60) Provisional application No. 62/035,456, filed on Aug. 10, 2014.

(51) Int. Cl.
*A01K 5/00* (2006.01)
*A01K 5/01* (2006.01)
*A01M 31/00* (2006.01)

(52) U.S. Cl.
CPC ......... *A01K 5/0107* (2013.01); *A01M 31/008* (2013.01)

(58) Field of Classification Search
CPC ...... A01K 5/0225; A01K 39/012; A01K 5/01; A01K 5/00; A01K 5/0107; A01K 5/001; A01M 31/008
USPC ....... 119/53, 51.01, 52.1, 57.91, 57.92, 61.2, 119/52.4, 57.4
See application file for complete search history.

(56) References Cited

U.S. PATENT DOCUMENTS

| | | | | |
|---|---|---|---|---|
| 2,171,998 A | * | 9/1939 | Trapani | A01K 39/012 119/53 |
| 2,290,042 A | * | 7/1942 | Granville | A01K 5/0107 119/52.4 |
| 2,612,137 A | * | 9/1952 | Fuls | A01K 5/0225 119/53 |
| 2,661,720 A | * | 12/1953 | Rysdon | A01K 5/025 119/53 |
| 2,974,634 A | * | 3/1961 | Williams | A01K 5/0225 119/52.4 |
| 3,565,044 A | * | 2/1971 | Sorrels | A01K 5/0107 119/53 |
| 3,613,641 A | * | 10/1971 | Geerlings | A01K 5/025 119/51.11 |
| 3,782,333 A | * | 1/1974 | Feterl | A01K 5/0107 119/52.4 |
| 4,201,155 A | * | 5/1980 | Hyde, Jr. | A01K 39/012 119/57.8 |
| 4,258,663 A | * | 3/1981 | Schoessow | A01K 5/0107 119/58 |
| 4,312,297 A | * | 1/1982 | Roberts | A01K 5/0107 119/53 |
| 4,334,502 A | * | 6/1982 | Cox | A01K 5/0107 119/53 |
| 4,364,333 A | * | 12/1982 | Touchette | A01K 5/0107 119/52.4 |

(Continued)

*Primary Examiner* — Yvonne Abbott-Lewis
(74) *Attorney, Agent, or Firm* — James R Bell

(57) ABSTRACT

A portable feed is provided with a frame having a tow hitch, a plurality of wheels and a storage bin. The portable feeder can be towed from a feeder location to a refill station and refilled. A variably sloped floor extending through the storage bin and each feeder chute provides for the continuous flow of feed to the chutes for on demand feeding without substantial spillage from the open ends of the feeder chutes. A lower chute surface is pivotable relative to an upper chute surface so that the lower chute surface is movable relative to the upper chute surface in a clamshell-like closure.

20 Claims, 5 Drawing Sheets

(56) References Cited

U.S. PATENT DOCUMENTS

| | | | | | |
|---|---|---|---|---|---|
| 5,209,183 | A | * | 5/1993 | Sampson | A01K 5/0107 119/53 |
| 5,237,962 | A | * | 8/1993 | Garman | A01K 5/01 119/58 |
| 5,595,140 | A | * | 1/1997 | Charboneau | A01K 5/01 119/58 |
| 5,740,757 | A | * | 4/1998 | Smeester | A01K 5/00 119/51.02 |
| 6,263,833 | B1 | * | 7/2001 | Runyan | A01K 5/001 119/51.11 |
| 6,575,117 | B1 | * | 6/2003 | Rasmussen | A01K 5/0114 119/57.1 |
| 6,675,738 | B1 | * | 1/2004 | Kemnitz | A01K 5/0107 119/408 |
| 6,889,630 | B1 | * | 5/2005 | Wayman | A01K 5/0291 119/57.92 |
| 6,920,841 | B2 | * | 7/2005 | Meritt | A01K 1/10 119/51.01 |
| 8,919,285 | B1 | * | 12/2014 | Chambers | A01K 5/0266 119/57.92 |
| 2010/0212597 | A1 | * | 8/2010 | Wolfe | A01K 5/0107 119/58 |
| 2012/0037079 | A1 | * | 2/2012 | Rasmussen | A01K 5/0225 119/52.3 |
| 2014/0230736 | A1 | * | 8/2014 | Gates | A01K 5/0225 119/53 |

* cited by examiner

PORTABLE DEER AND LIVESTOCK FEEDER

CROSS-REFERENCE TO RELATED APPLICATIONS

This application is a Continuation-in-Part of U.S. application Ser. No. 14/821,768, filed Aug. 9, 2015, which claims priority to U.S. Provisional Application No. 61/939,273, filed Aug. 10, 2014, which is incorporated by reference herein in its' entirety.

BACKGROUND

This disclosure relates generally to wildlife feeding devices and more particularly to portable deer and livestock feeders.

There are various feeder devices, some of which are small and some being larger commercial type feeders. The large feeders store hundreds of pounds of feed such as grain for self-feeding deer and livestock in the field. Such large feeders are stationary and are kept outdoors so that they can be accessed by deer and cattle. The feeders have a gravity type feeding structure which typically gravity feeds the grain, such as corn or other suitable feed, from a storage bin or hopper to a plurality of chutes which conduct the grain to an opening in a terminal end of each chute which is easily accessed by the deer and livestock.

Periodically, these large stationary storage bins must be refilled but because of their prohibitive size and weight, the grain is transported to the feeders. This process involves transporting a portable refill hopper to a feed store and positioning the refill hopper under a large elevated grain storage device. The portable refill hopper is refilled by gravity feeding the grain from the elevated grain storage device and then transporting the portable refill hopper back to the location of the feeders. A large and powerful (and expensive) blower device is then used to draw the grain from the portable refill hopper and blow the grain into the stationary feeder via flexible conduits.

It can be seen from the above description that it would be of benefit if an alternative device provided a method for refilling the large commercial feeders which was less expensive and less time consuming.

SUMMARY

A portable feeder is provided with a frame having a tow hitch, a plurality of wheels and a storage bin. A pair of feeder chutes are connected to the storage bin and a sloped floor of the storage bin is connected to a sloped floor of each chute so that feed in the storage bin is continuously provided to each feeder chute. A movable fill door is provided on the storage bin and a movable feeder door is provided on a terminal open end of each feeder chute. The portable feeder can be towed from a feeder location to a refill station and refilled via the fill door. The doors on the feeder chutes are closed during transport and opened when the portable feeder is parked at the feeder location so that feeding via the chutes is facilitated. A variably sloped floor extending through the storage bin and each feeder chute provides for the continuous flow of feed to the chutes for on demand feeding without substantial spillage from the open ends of the feeder chutes. A lower chute surface is pivotable relative to an upper chute surface so that the lower chute surface is movable relative to the upper chute surface in a clamshell-like closure.

DETAILED DESCRIPTION

Figure 1:
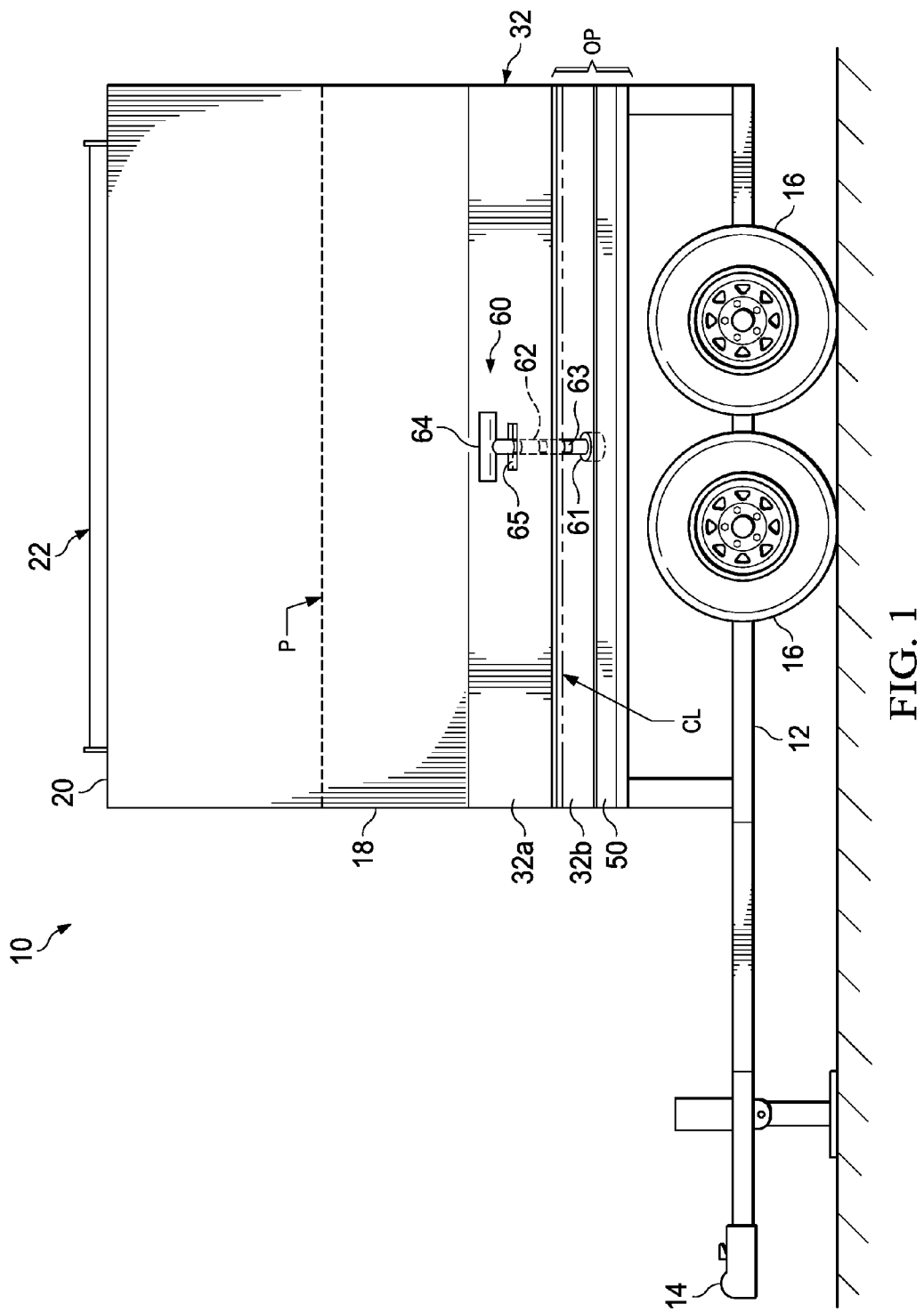
FIG. 1 is a side view illustrating an embodiment of a portable feeder.
Figure 2:
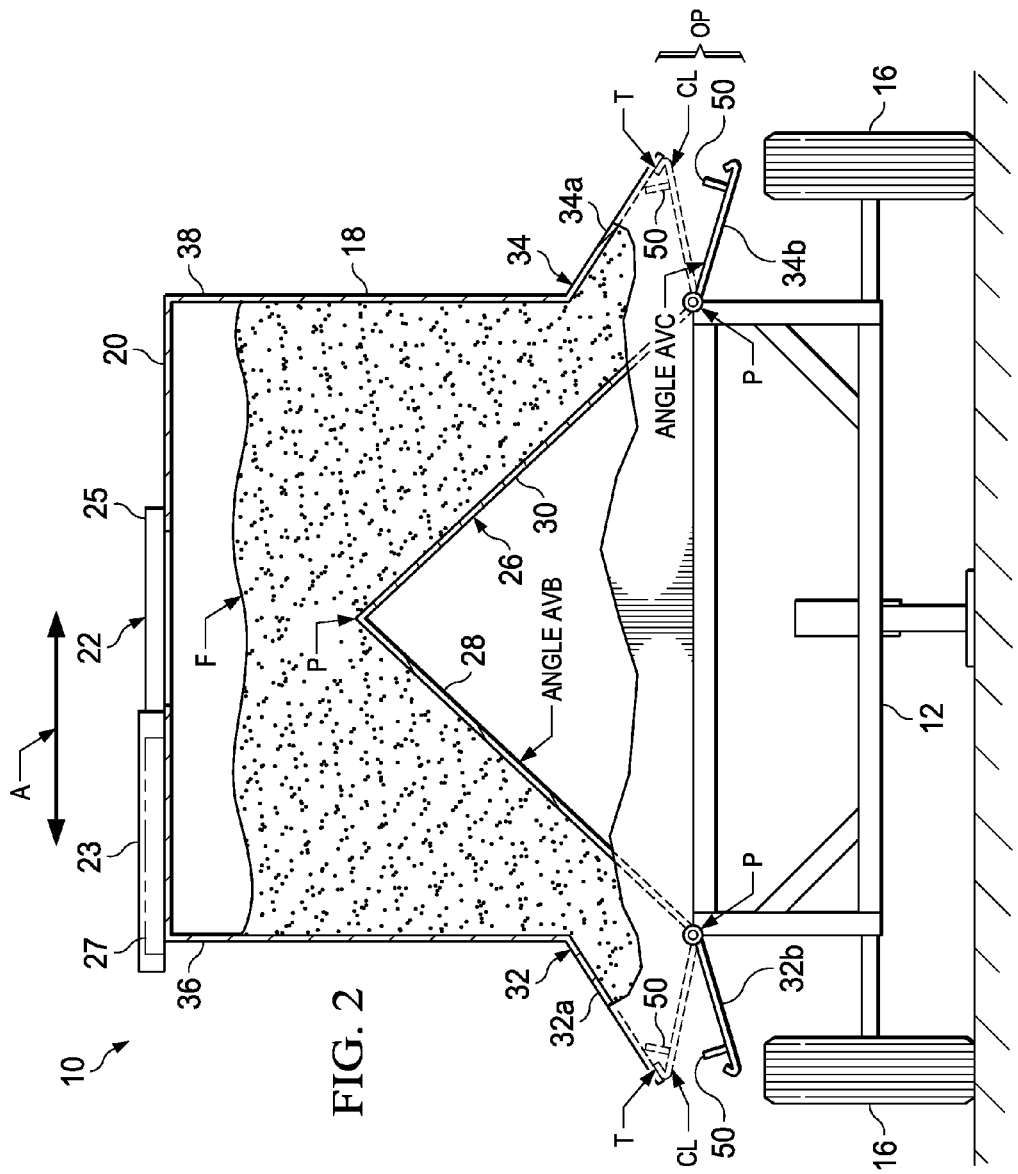
FIG. 2 is an end view illustrating the portable feeder of FIG. 1 having a floor portion of the portable feeder illustrated in phantom outline.

Referring to FIGS. 1 and 2, a portable feeder is designated 10 and includes a frame 12 having a tow hitch 14 and a plurality of wheels 16. A storage bin 18 is mounted on the frame 12 and includes a top surface 20 including a refill door 22. The refill door 22 is slidably mounted in a retaining frame 23, and is movable between a closed position 25 and an open position 27 as illustrated by a directional arrow designated A. Refill door 22 is opened only when bin 18 is being refilled.

Figure 3A:
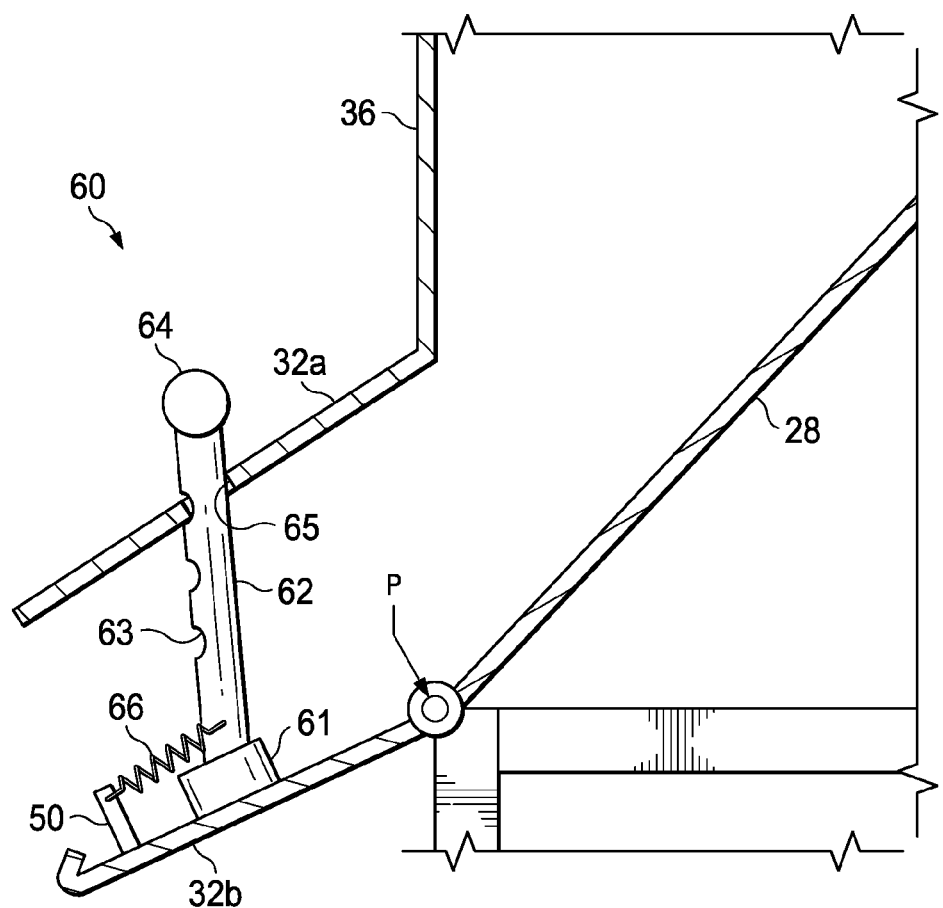
FIGS. 3a and 3b are partial views illustrating the adjustable chute in an open and a closed position including a resiliently biased handle.
Figure 3B:
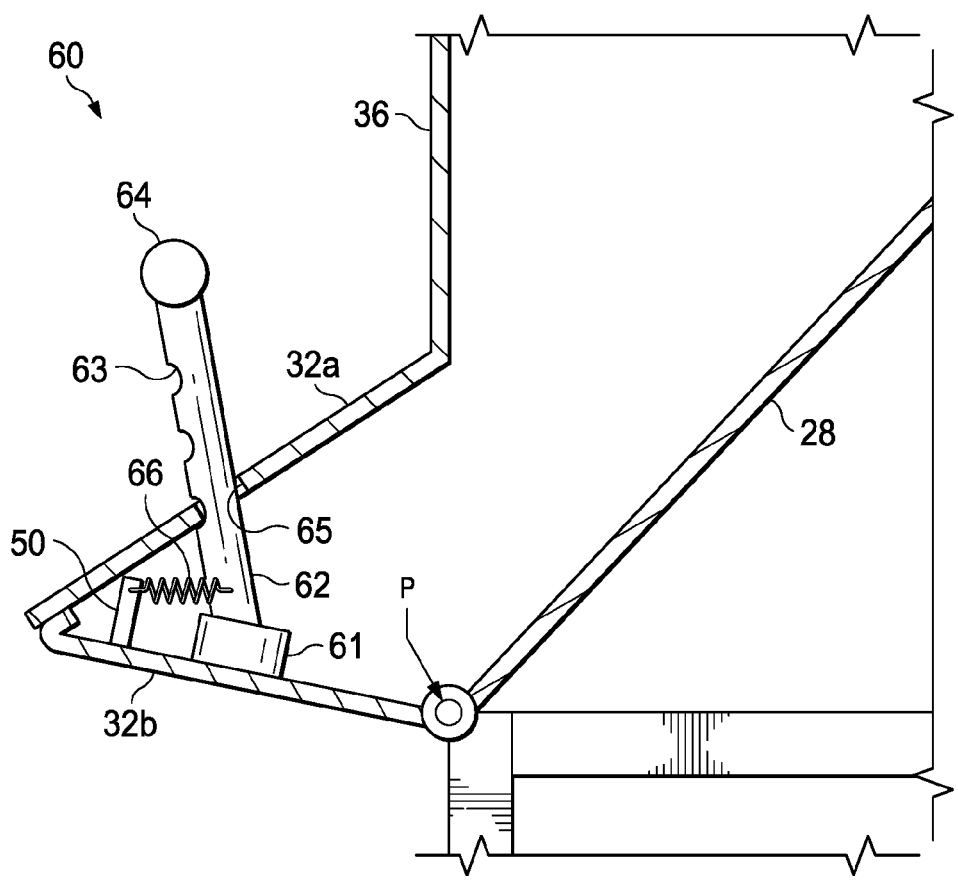

A floor 26 of storage bin 18 has a first angled floor portion 28 and a second angled floor portion 30. Floor portions 28, 30 converge at a peak P. The angled floor portions 28, 30 direct feed F, stored in bin 18, toward a first feeder chute 32 and a second feeder chute 34, respectively. The first and second feeder chutes 32, 34 each extend downward and outward from a first side 36 and a second side 38 of the storage bin 18. Each of the chutes 32 and 34 includes an upper stationary chute surface 32a, 34a, and a lower movable chute surface 32b, 34b, which is pivotably connected at P to the angled bin floor portions 28 and 30, respectively. Each pivotable lower chute surface 32b, 34b is movable between an open position OP and a closed position CL. Thus, when in the open position OP, the lower chute surfaces 32b, 34b are spaced apart from their respective upper chute surfaces 32a, 34a. In contrast, when in the closed position CL, the lower chute surfaces 32b, 34b, are moved and in so doing, a terminal end of each lower chute surface 32b, 34b engages substantially into contact with a terminal end each upper chute surface 32a, 34a in a clamshell-like contact at a point T. In FIG. 1, chute 32 illustrates upper chute surface 32a and lower chute surface 32b in the open position OP in solid line depiction, and in the closed position CL in broken line depiction. In FIG. 2, each chute 32, 34 is shown in the open position OP in solid line depiction, and in the closed position CL in broken line depiction. In FIGS. 1, 3a and 3b, a handle 60 is pivotably attached to each lower chute surface 32b, 34b (34b is not shown). Each handle 60 includes a coil spring-loaded pivotable attachment 61, and an elongated arm 62 which includes a plurality of notches 63 and a grip 64. The arm 62 extends through each upper chute surface 32a, 34a which includes a slot 65. The arm 62 extends through the slot 65 and the slot 65 is engaged by any selected one of the notches 63 so as to position and retain the lower chute surfaces 32b, 34b in either of the open or closed positions OP, CL, respectively, due to the spring-loaded pivotable attachment 61 in which a coil spring 66 biases the notches into engagement with slot 65. In FIGS. 3a, 3b, only chute 32 is illustrated inasmuch as chute 34 is a duplication and therefor a duplicate description of both chutes is not required. It is to be noted that handle 60 is not illustrated in FIG. 2 and is deferred to FIGS. 1, 3A and 3B. It is to be understood however, that handle 60 is omitted in FIG. 2 only for the purpose of illustrating other features more clearly. Finally, a vertically extending lip portion 50 extends lengthwise along an edge of lower chute surfaces 32b, 34b. The lip 50 reinforces the lower chute surfaces 32b, 34b and also assists in limiting spillage and retaining feed in the respective chutes 32, 34.

A preferred angle value for angle AVB for each of the angled bin floor portions 28 and 30 is from about 40 degrees to about 50 degrees from the horizontal. A preferred angle value AVC for each of the lower chute surfaces 32b, 34b of chutes 32 and 34, respectively, to reduce grain flow in the chutes 32, 34 and limit spillage, is from about 20 degrees to about 25 degrees from the horizontal. Therefore, in order to sustain adequate grain flow from the bin 18 to the chutes 32, 34, the angle value AVB is about two times the angle value AVC of the chutes 32, 34. Stated another way, in order to decrease grain flow in the chutes 32, 34 to avoid substantial spillage, or feed loss, the angle value AVC of the chutes is about one-half of the angle value AVB of grain flow in the bin 18.

Figure 4:
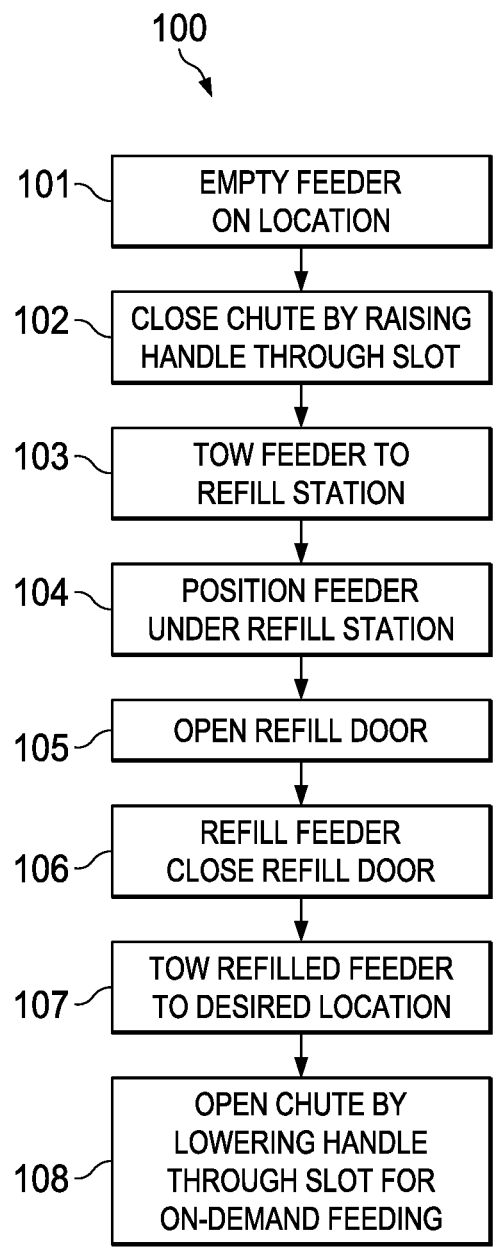
FIG. 4 is a flow diagram illustrating a method of refilling the portable feeder.

In use, see flow chart 100, FIG. 4, the portable feeder 10 is placed in a selected location at 101 for on-demand feeding and eventually becomes empty and needs to be refilled. A towing vehicle (not shown) is connected to tow hitch 14 and feeder chutes 32, 34 are closed. Feeder 10 is then towed to a refill location at 103 where feed is gravity fed from an elevated feed storage device (not shown). The portable feeder 10 is positioned under the feed storage device at 104 and refill door 22 is opened by a handle 60 at 105. Feed is released into the portable feeder 10 via door 22 until bin 18 is substantially filled. Door 22 is closed at 106 and portable feeder 10 is moved to a desired location at 107 and parked for on-demand feeding. Feeder chutes 32, 34 are opened by handle 60 at 108 and the feeder 10 is available for on-demand feeding until another refill is needed.

Although illustrative embodiments have been shown and described, a wide range of modification, change and substitution in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable feeder comprising:
   a frame including a tow hitch and a plurality of wheels;
   a refillable storage bin mounted on the frame;
   a floor in the storage bin, the floor having a first angled bin floor portion and a second angled bin floor portion; and
   a first feeder chute extending downward and outward from a first side of the storage bin and having a second feeder chute extending downward and outward from a second side of the storage bin, each feeder chute having an upper chute surface and a lower chute surface, each lower chute surface being pivotably connected to the first and second angled bin floor portions, respectively, and being pivotable between an open position and a closed position, wherein in the open position, the lower chute surface is spaced apart from the upper chute surface defining an opening, and wherein, in the closed position, the lower chute surface closes the opening in a clamshell-like closure with the upper chute surface.

2. The portable feeder of claim 1 wherein the refillable storage bin includes a refill door.

3. The portable feeder of claim 2 wherein the refill door is positioned on a top surface of the storage bin.

4. The portable feeder of claim 3 wherein the refill door is slidably mounted on the top surface of the storage bin, the refill door being movable between an open position and a closed position.

5. The portable feeder of claim 2 wherein the first angled bin floor portion and the second angled bin floor portion converge to form a peak centered below the refill door.

6. The portable feeder of claim 1, further comprising:
   a handle extending from the lower chute surface and through a slot in the upper chute surface.

7. The portable feeder of claim 6 wherein the handle is pivotably connected to the lower chute surface.

8. A portable feeder comprising:
   a frame including a tow hitch and a plurality of wheels;
   a storage bin mounted on the frame, the storage bin having a top surface including a refill door being movable between an open position and a closed position;
   a floor in the storage bin, the floor having a first angled bin floor portion and a second angled bin floor portion, the first and second angled bin floor portions converging to form a peak adjacent the fill door; and
   a first feeder chute extending downward and outward from a first side of the storage bin and having a second feeder chute extending downward and outward from a second side of the storage bin, each chute extending along substantially an entire length, respectively, of the first and second sides of the storage bin and having an upper chute surface and a lower chute surface, each lower chute surface being pivotably connected to the first and second angled bin floor portions, respectively, and being pivotable between an open position and a closed position, wherein the open position, the lower chute surface is spaced apart from the upper chute surface defining an opening, and wherein, in the closed position, the lower chute surface closes the opening in a clamshell like closure with the upper chute surface.

9. The portable feeder of claim 8 wherein the refill door is supported in a frame.

10. The portable feeder of claim 9 wherein the refill door is positioned on a top surface of the storage bin.

11. The portable feeder of claim 10 wherein the refill door is slidably mounted on the top surface of the storage bin.

12. The portable feeder of claim 9 wherein the first angled bin floor portion and the second angled bin floor portion converge to form a peak centered adjacent the refill door.

13. The portable feeder of claim 8, further comprising:
   a handle extending from the lower chute surface and through a slot in the upper chute surface.

14. The portable feeder of claim 13, wherein the handle is pivotably and resiliently connected to the lower chute surface.

15. The portable feeder of claim 8 wherein each lower chute surface is connected to its respective angled bin floor portion by at least one hinge.

16. The portable feeder of claim 13 wherein the handle includes a rod and a grip.

17. The portable feeder of claim 16 wherein the rod includes a plurality of notches formed in a surface of the rod.

18. The portable feeder of claim 17, further comprising:
   a notch engaging surface in the slot.

19. The portable feeder of claim 18 wherein the notches are resiliently urged against the slot by the resilient pivotable connection of the handle to the lower chute surface.

20. A method of refilling a portable feeder comprising:
   providing a feeder having a storage bin mounted on a frame including a tow hitch and a plurality of wheels;

providing a fill door on a top surface of the storage bin, the fill door being movable between an open position and a closed position;

forming a floor in the storage bin, the floor having a first angled bin floor portion and a second angled bin floor portion;

attaching a first feeder chute extending downward and outward from a first side of the storage bin, and attaching a second feeder chute extending downward and outward from a second side of the storage bin each feeder chute having an upper and a lower chute surface, and each lower chute surface being pivotably connected to a respective angled bin floor portion and pivotable between an open position relative to the upper chute surface, and a closed position engaging the upper chute surface in a clamshell-like closure;

moving the lower chute surface to the closed position by means of a handle extending from an attachment to the lower chute surface and through a slot in the upper chute surface;

engaging a notch on the handle with the slot;

towing the portable feeder to a feed refill station and positioning the storage bin under the feed refill station;

moving the fill door to the open position, refilling the storage bin with feed, and moving the fill door to the closed position;

towing the portable feeder to a desired location and parking the portable feeder at the desired location; and moving the lower chute surface to the open position by disengaging the notch on the handle with the slot.

* * * * *